US010355799B2

(12) United States Patent
Abdullah et al.

(10) Patent No.: US 10,355,799 B2
(45) Date of Patent: Jul. 16, 2019

(54) PSEUDOWIRE CLOCK RECOVERY

(71) Applicant: Ciena Corporation, Hanover, MD (US)

(72) Inventors: Bashar Abdullah, Ottawa (CA); Kevin Estabrooks, Ottawa (CA); Gregory Vanderydt, Ottawa (CA); Stephen Donald Crooks, Ottawa (CA)

(73) Assignee: Ciena Corporation, Hanover, MD (US)

( * ) Notice: Subject to any disclaimer, the term of this patent is extended or adjusted under 35 U.S.C. 154(b) by 69 days.

(21) Appl. No.: 15/719,175

(22) Filed: Sep. 28, 2017

(65) Prior Publication Data

US 2019/0097744 A1    Mar. 28, 2019

(51) Int. Cl.
*H04J 3/06*    (2006.01)

(52) U.S. Cl.
CPC .......... *H04J 3/0661* (2013.01); *H04J 3/0632* (2013.01)

(58) Field of Classification Search
CPC ...... H04J 3/0682; H04J 3/0667; H04J 3/0673; H04J 3/0664; H04J 3/0697; H04W 92/24; H04W 56/00; H04W 92/0863; H04L 29/08891; H04L 67/147; G06F 1/12
See application file for complete search history.

(56) References Cited

U.S. PATENT DOCUMENTS

| | | | |
|---|---|---|---|
| 2003/0177154 A1* | 9/2003 | Vrancic | G06F 1/12 708/160 |
| 2007/0226530 A1* | 9/2007 | Celinski | G06F 1/12 713/500 |
| 2011/0261917 A1* | 10/2011 | Bedrosian | H04J 3/0667 375/371 |
| 2015/0071309 A1* | 3/2015 | Aweya | H04J 3/0682 370/503 |
| 2016/0359610 A1* | 12/2016 | Karthik | H04L 7/0008 |
| 2017/0366287 A1* | 12/2017 | Zeng | H04W 56/00 |

* cited by examiner

*Primary Examiner* — Jung Liu
(74) *Attorney, Agent, or Firm* — Clements Bernard Walker PLLC; Christopher L. Bernard; Lawrence A. Baratta, Jr.

(57) ABSTRACT

Clock synchronization in a network includes receiving, by a slave network device from a master network device via at least a intervening network device, a timing packet comprising a transmission timestamp and a residence time. The transmission timestamp is based on a master clock of the master network device. The residence time corresponds to a delay of the timing packet traversing the intervening device. Clock synchronization in a network further includes generating, by the slave network device in response to receiving the timing packet, a receiving timestamp based on a slave clock of the slave network device, and generating, based at least on the transmission timestamp, the residence time, and the receiving timestamp, a time difference between the master clock and the slave clock. Clock synchronization in a network further includes synchronizing, based at least on the time difference, the master clock and the slave clock.

20 Claims, 11 Drawing Sheets

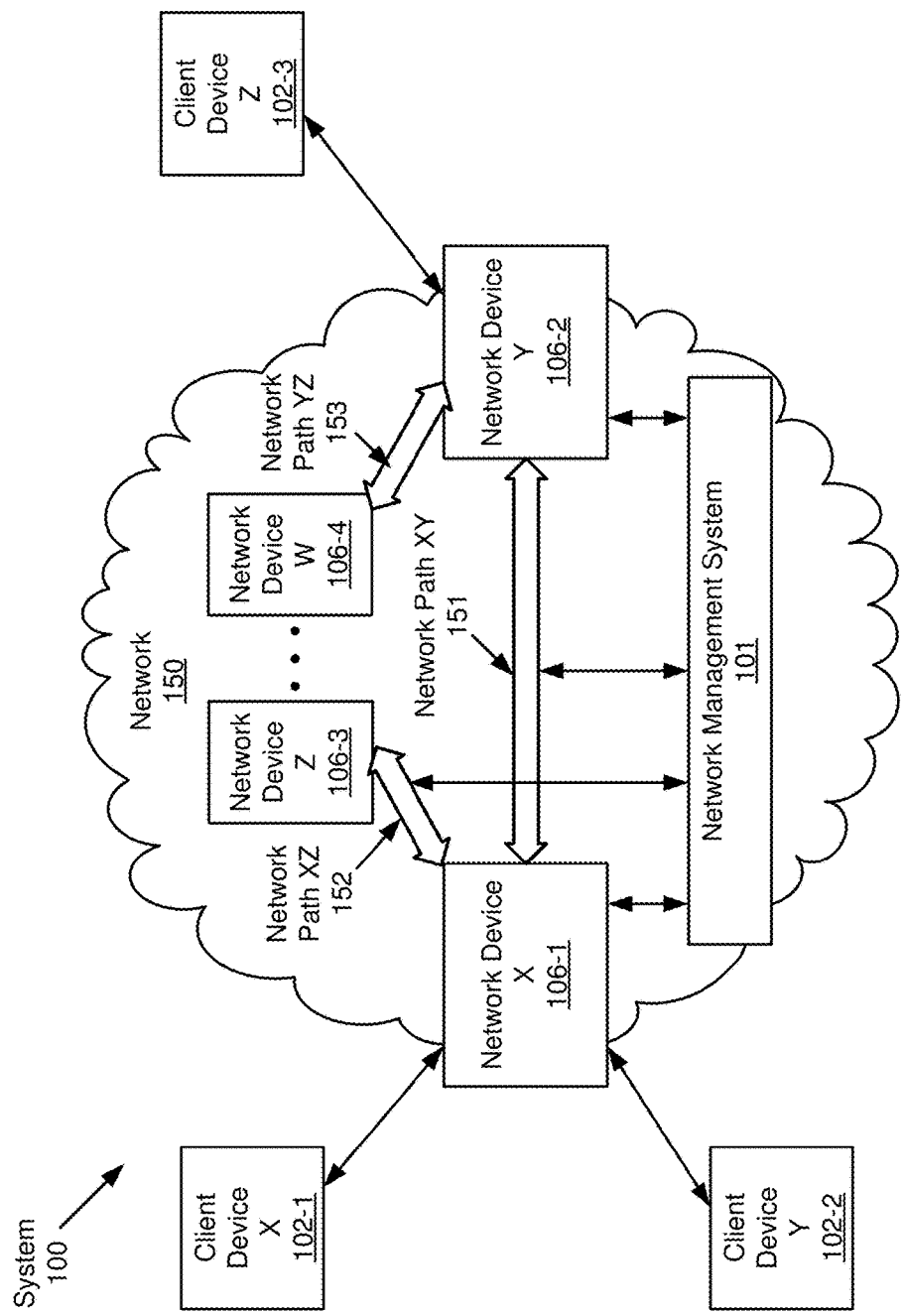
FIG. 1.1

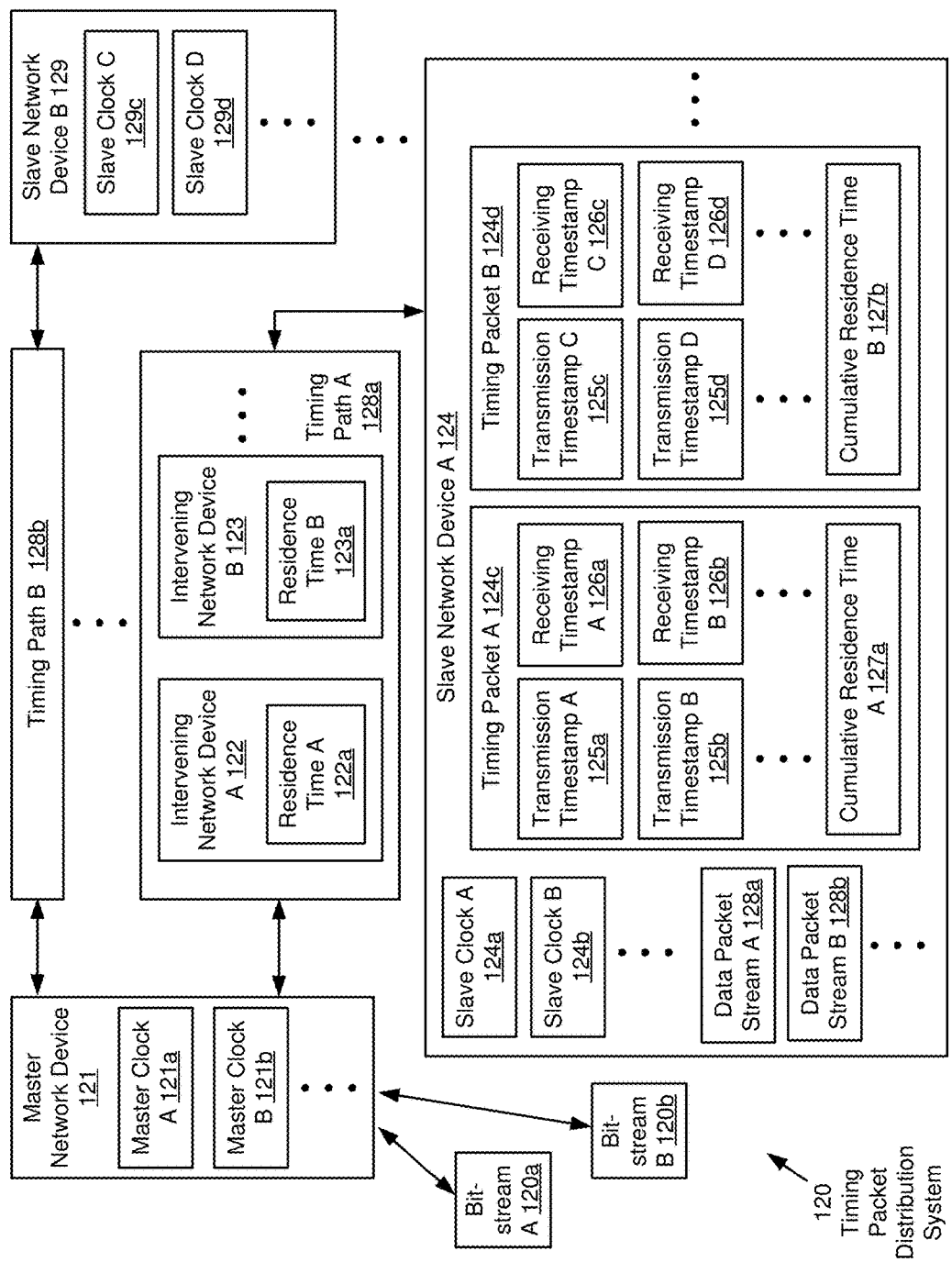
FIG. 1.2

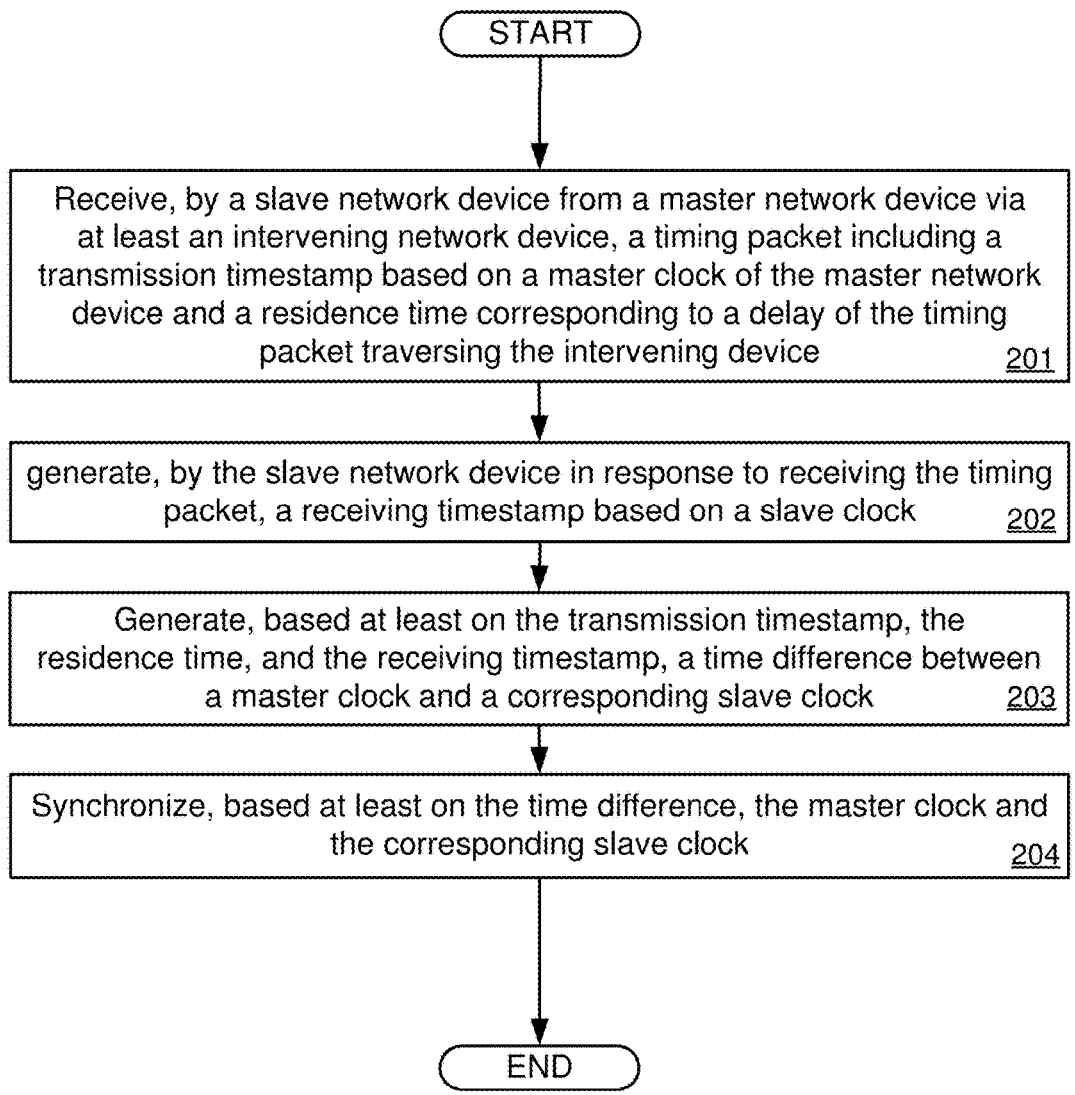
FIG. 2.1

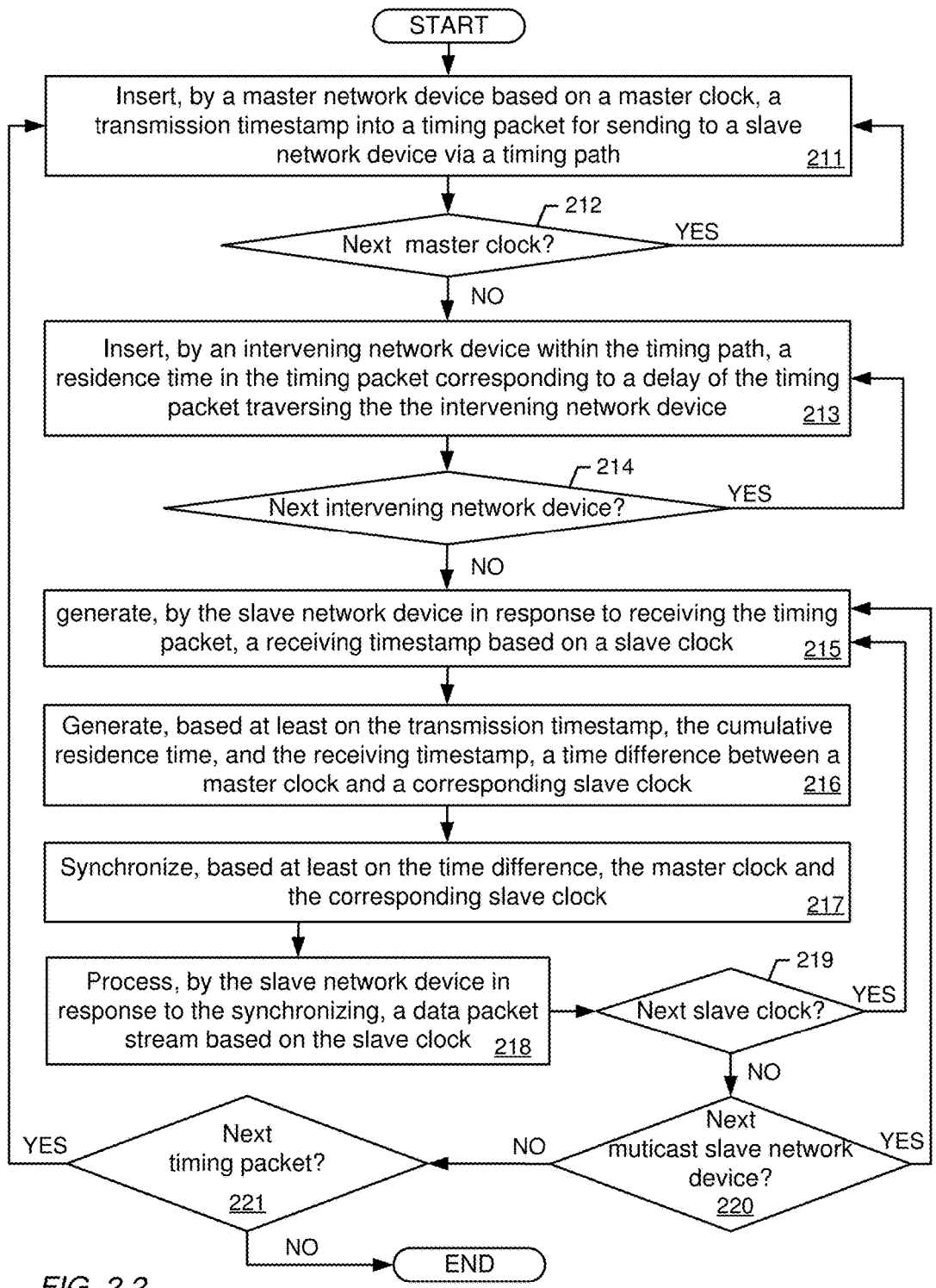
FIG. 2.2

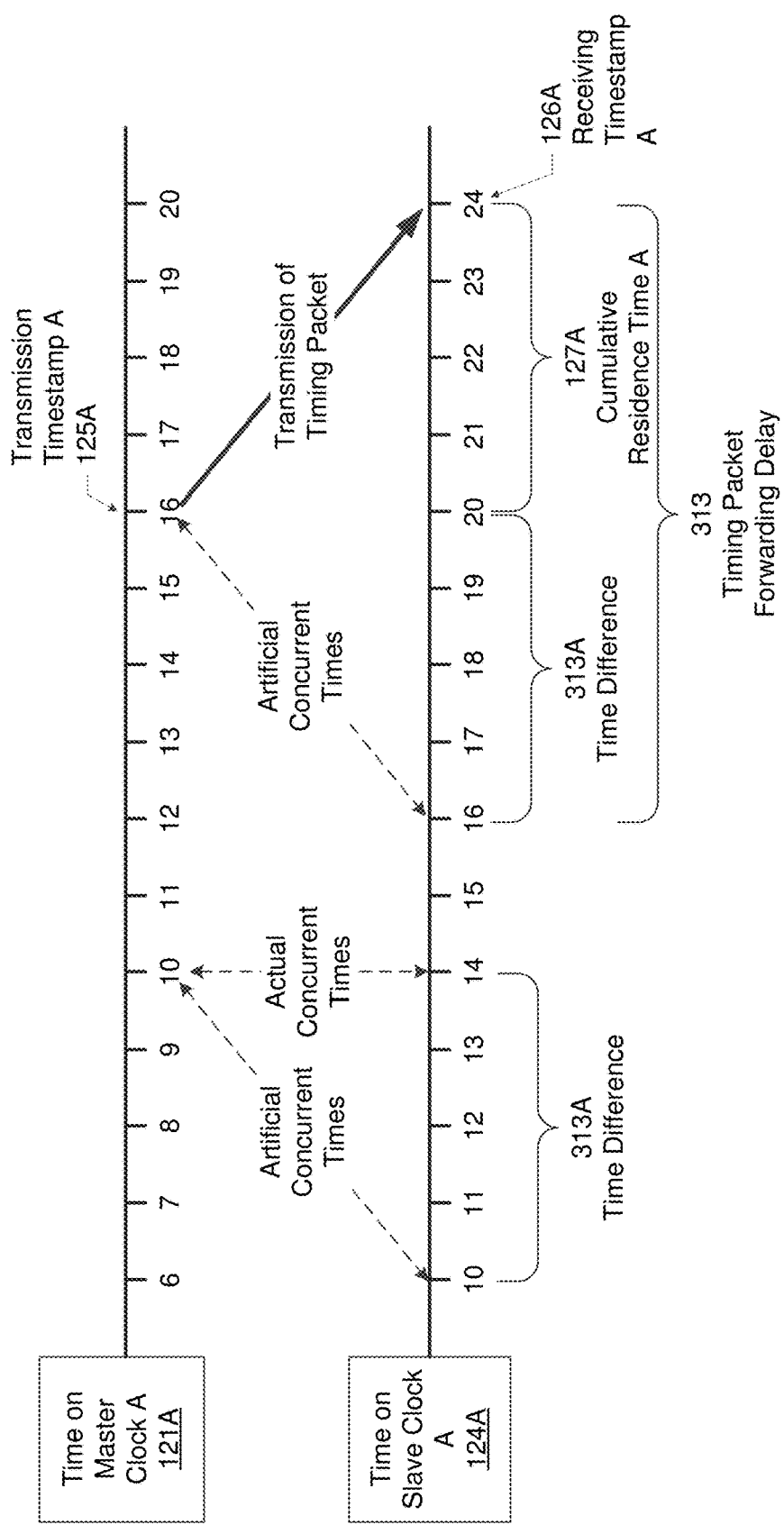
FIG. 3.1

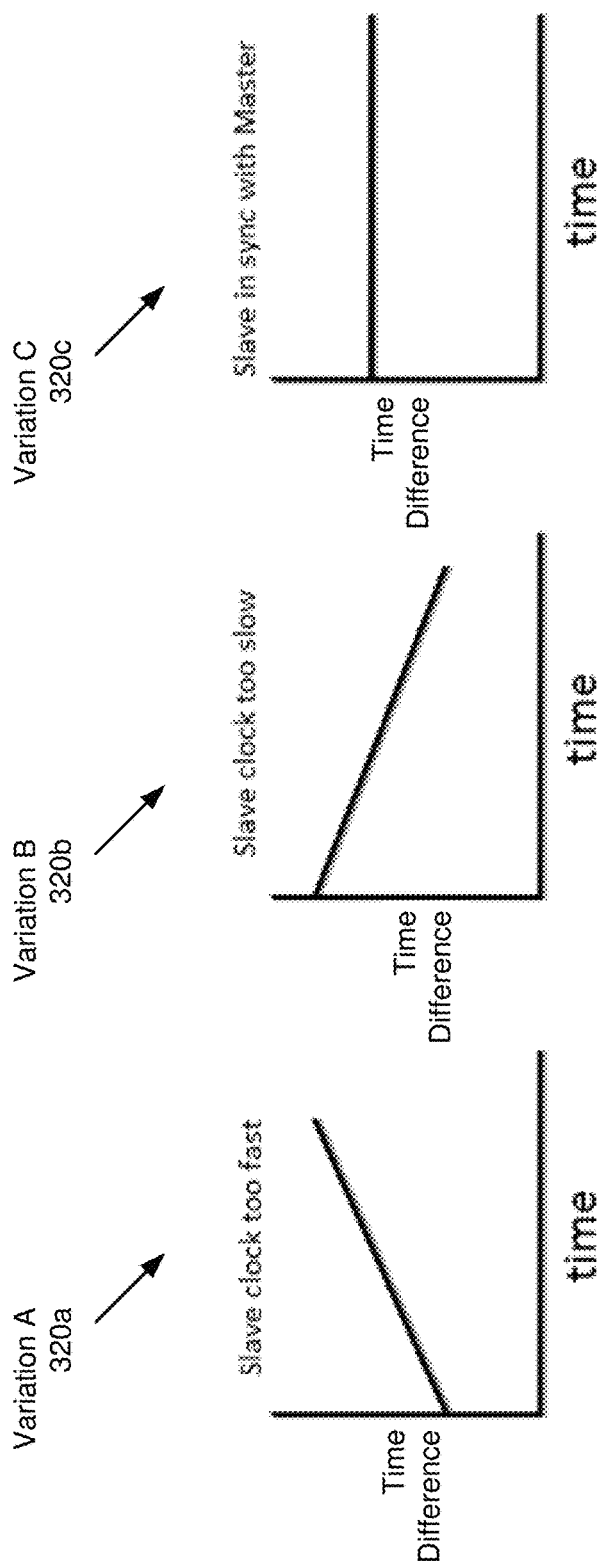
FIG. 3.2

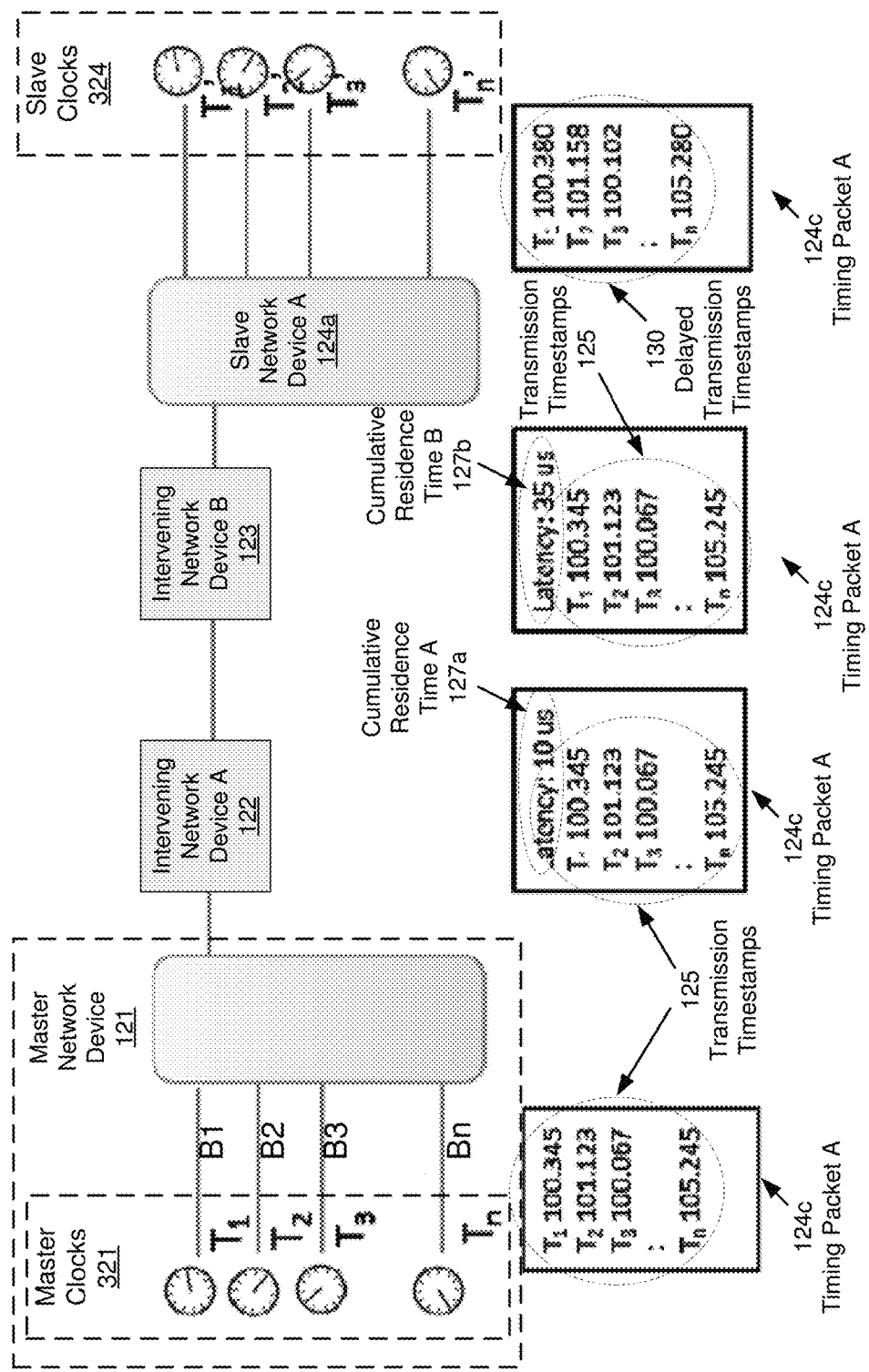
FIG. 3.3

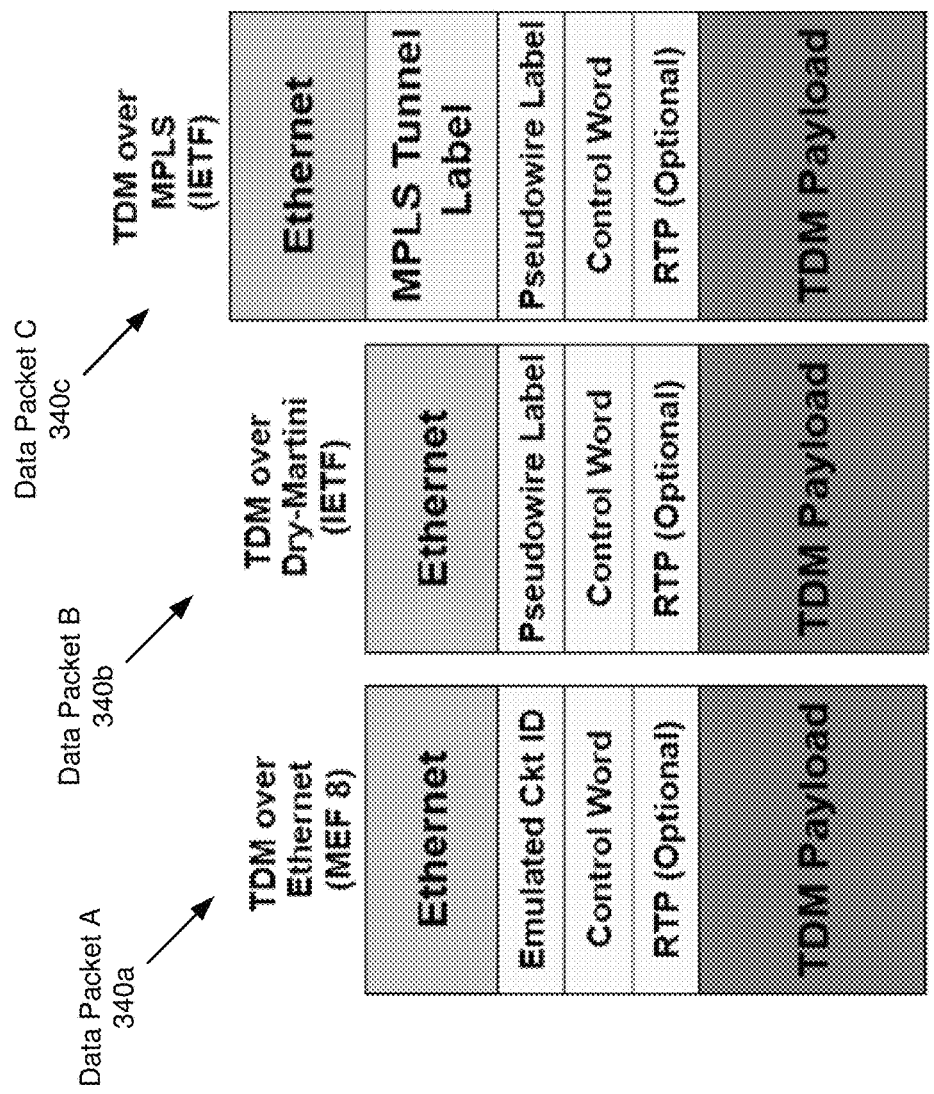
FIG. 3.4

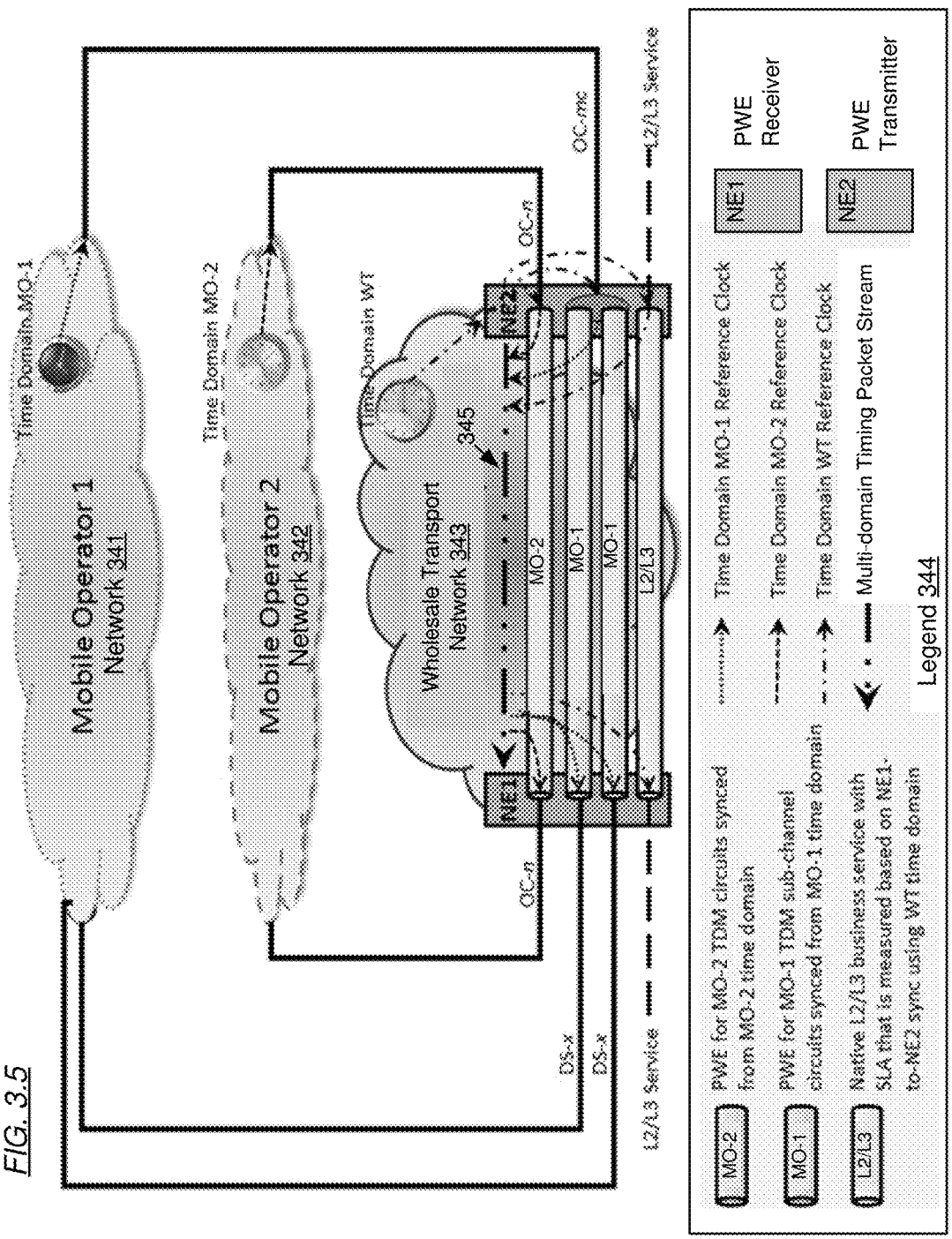
FIG. 3.5

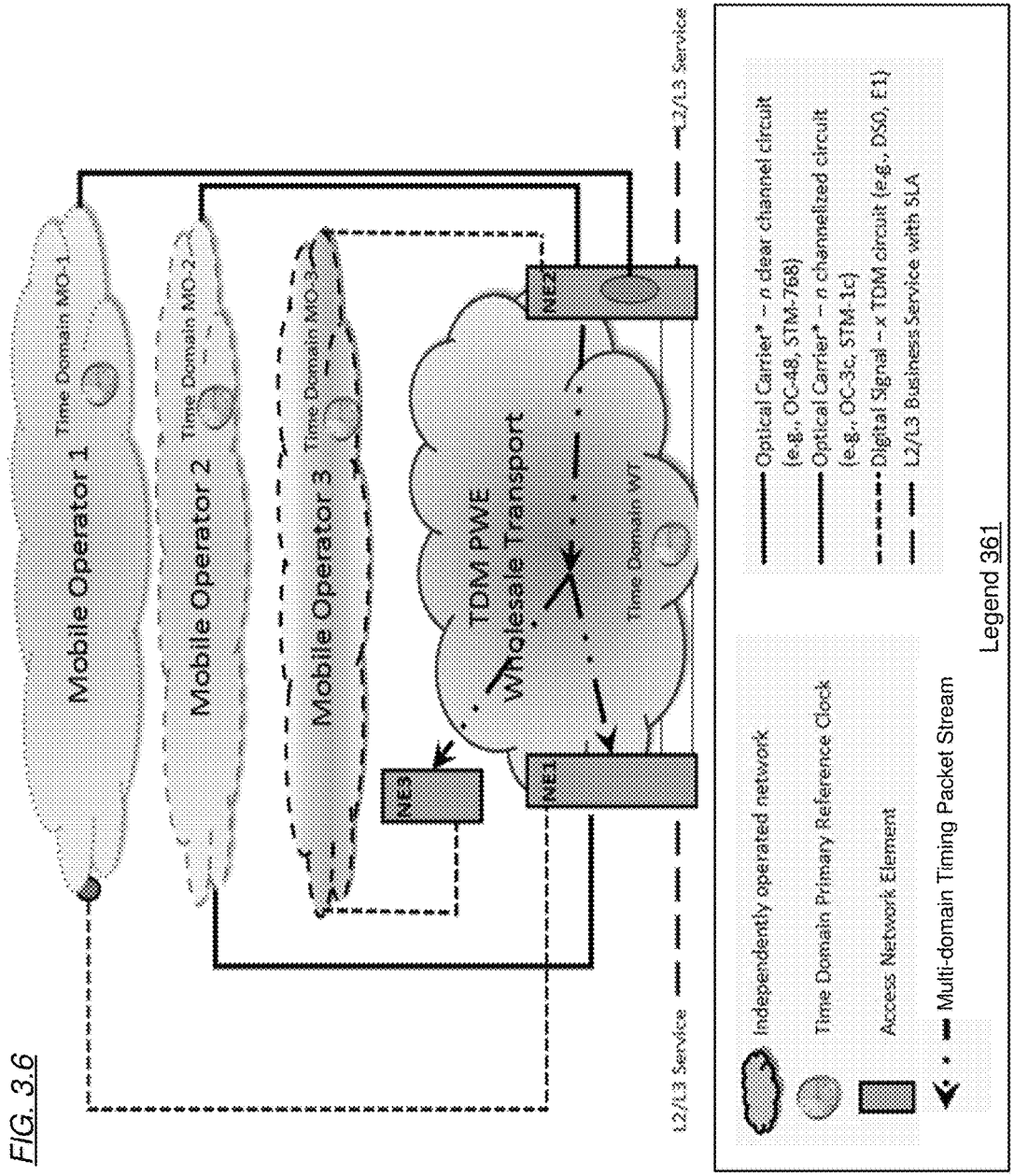
FIG. 3.6

PSEUDOWIRE CLOCK RECOVERY

BACKGROUND

A network packet is a formatted data item that is transmitted by a network. The network that transmits network packets is a packet transport network. Formatting data into packets allows for packet switching and sharing of network bandwidth among a large number of users. A packet includes control information and user data, which is also known as the payload. Control information includes metadata for delivering the payload, such as source and destination network addresses, error detection codes, etc. Typically, control information is found in packet headers and/or trailers.

Time-division multiplexing (TDM) is a method of transmitting and receiving independent signals over a common signal path. TDM may be performed by synchronized switches at each end of the transmission line so that each signal appears on the line only a fraction of time in an alternating pattern. In circuit-switched networks, such as the public switched telephone network (PSTN), multiple subscriber calls over the same transmission medium may be transmitted to effectively utilize the bandwidth of the medium. TDM allows transmitting and receiving telephone switches to create channels within a transmission stream. For example, a standard DS0 voice signal has a data bit rate of 64 kbit/s. A TDM circuit runs at a much higher signal bandwidth, permitting the bandwidth to be divided into time frames (time slots) for each voice signal which is multiplexed onto the line by the transmitter. Each voice time slot in the TDM frame is referred to as a channel. For example, E1 contain 30 digital voice channels, while T1 contain 24 channels. Additional examples of TDM telecommunication system include SONET/SDH, ISDN, etc.

SUMMARY

In general, in one aspect, the invention relates to a method for clock synchronization in a network. The method includes receiving, by a slave network device from a master network device via at least a intervening network device, a timing packet comprising a transmission timestamp and a residence time. The transmission timestamp is based on a master clock of the master network device. The residence time corresponds to a delay of the timing packet traversing the intervening device. The method further includes generating, by the slave network device in response to receiving the timing packet, a receiving timestamp based on a slave clock of the slave network device, and generating, based at least on the transmission timestamp, the residence time, and the receiving timestamp, a time difference between the master clock and the slave clock. The method further includes synchronizing, based at least on the time difference, the master clock and the slave clock.

In general, in one aspect, the invention relates to a slave network device that includes a first slave clock and circuitry. The circuitry is configured to receive, from a master network device via a first intervening network device, a first timing packet comprising a first transmission timestamp and a first residence time. The first transmission timestamp is based on a first master clock of the master network device. The first residence time corresponds to a delay of the first timing packet traversing the first intervening device. The circuitry is further configured to generate, in response to receiving the first timing packet, a first receiving timestamp based on the first slave clock, and generate, based at least on the first transmission timestamp, the first residence time, and the first receiving timestamp, a first time difference between the first master clock and the first slave clock. The circuitry is further configured to synchronize, based at least on the first time difference, the first master clock and the first slave clock.

In general, in one aspect, the invention relates to a non-transitory computer readable medium storing instructions for clock synchronization in a network. The instructions, when executed by a computer processor, include functionality for receiving, by a slave network device from a master network device via at least a intervening network device, a timing packet including a transmission timestamp and a residence time. The transmission timestamp is based on a master clock of the master network device. The residence time corresponds to a delay of the timing packet traversing the intervening device. The instructions, when executed by the computer processor, further include functionality for generating, by the slave network device in response to receiving the timing packet, a receiving timestamp based on a slave clock of the slave network device, and generating, based at least on the transmission timestamp, the residence time, and the receiving timestamp, a time difference between the master clock and the slave clock. The instructions, when executed by the computer processor, further include functionality for synchronizing, based at least on the time difference, the master clock and the slave clock.

Other aspects of the invention will be apparent from the following description and the appended claims.

BRIEF DESCRIPTION OF DRAWINGS

FIGS. 1.1 and 1.2 show block diagrams of a system in accordance with one or more embodiments of the invention.

FIGS. 2.1 and 2.2 show method flowcharts in accordance with one or more embodiments of the invention.

FIGS. 3.1, 3.2, 3.3, 3.4, 3.5, and 3.6 show an example in accordance with one or more embodiments of the invention.

DETAILED DESCRIPTION

Figure 4:
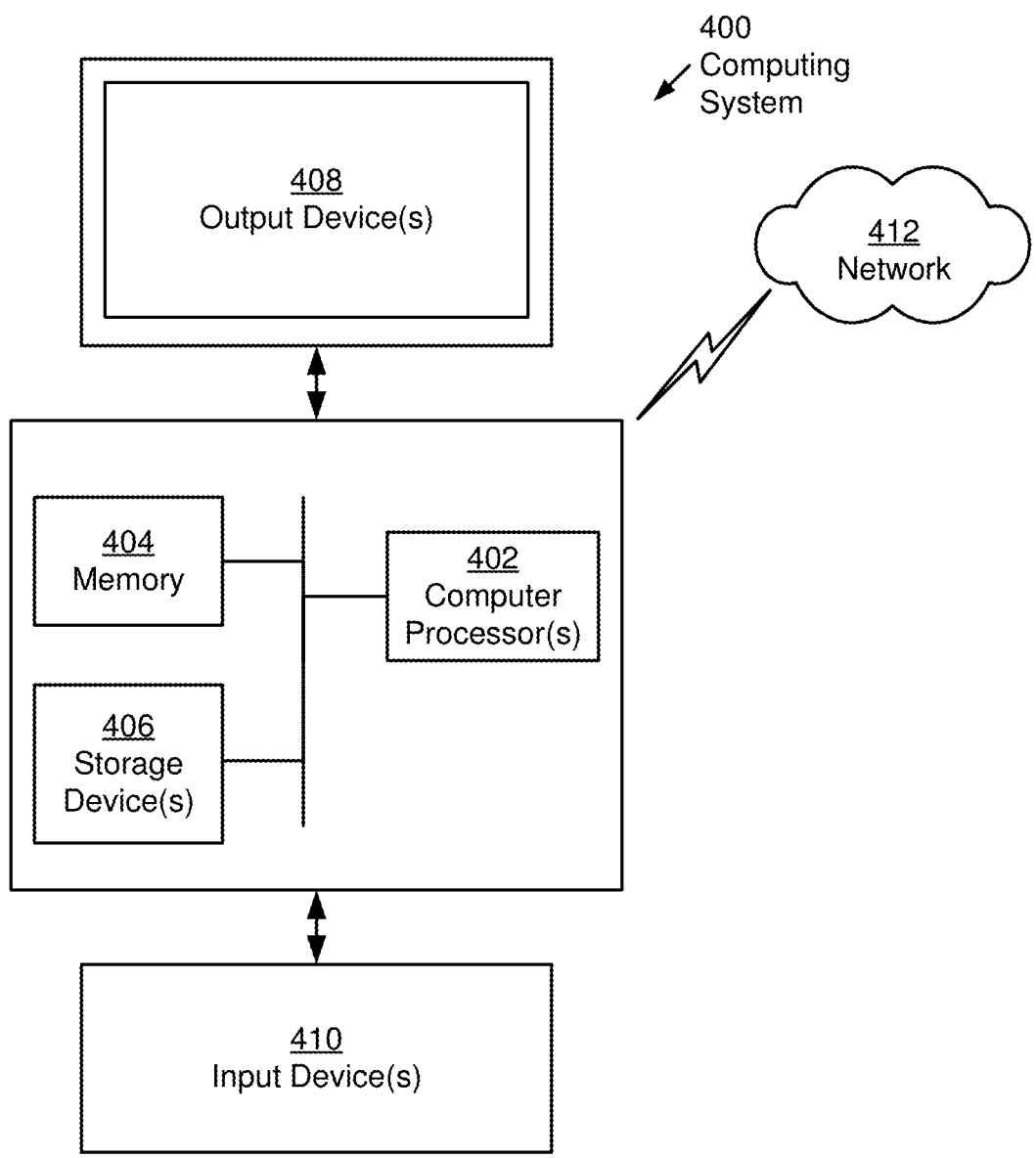
FIG. 4 shows a computing system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for clock synchronization in a network. In one or more embodiments, a timing packet for clock synchronization is received by a slave network device from a master network device via one or more intervening network devices. The timing packet includes a transmission timestamp and a residence time. The transmission timestamp is based on a master clock of the master network device. The residence time corresponds to a delay of the timing packet traversing the intervening device. The residence time may be accumulated over all intervening network devices to form a cumulative residence time. In addition, a receiving timestamp is generated by the slave network device based on a slave clock of the slave network device. A time difference between the master clock and the slave clock is generated based at least on the transmission timestamp, the cumulative residence time, and the receiving timestamp. Accordingly, the slave clock is synchronized to the master clock based at least on the time difference.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes multiple client devices (e.g., client device X (102-1), client device Y (102-2), client device Z (102-3), etc.) connected by a network (150) in accordance with one or more embodiments. A network is a set of interconnected computing devices that are configured to receive and forward packets in order to transmit information from a source client device to a destination client device. In one or more embodiments of the invention, the network (150) includes one or more of a local area network (LAN), a wide area network (WAN), a telecommunication network, etc, and may include wired and/or wireless portions of the Internet.

In general, the network (150) provides network services to the client devices (e.g., client device X (102-1), client device Y (102-2), client device Z (102-3), etc.). In particular, the network services are provided by one or more service providers operating the network (150) to one or more users of the client devices. For example, one or more client devices (e.g., client device X (102-1), client device Y (102-2), client device Z (102-3), etc.) may be configured to send data over the network (150). Similarly, one or more client devices (e.g., client device X (102-1), client device Y (102-2), client device Z (102-3), etc.) may be configured to receive data over the network (150). In one or more embodiments, the network services allow the client devices (e.g., client device X (102-1), client device Y (102-2), client device Z (102-3), etc.) to send/receive data in one or more signal types including Ethernet, digital video, Synchronous Optical Networking (SONET)/Synchronous Digital Hierarchy (SDH), G.709 Optical Transport Network (OTN), and other formats/protocols that are native to the client devices.

The client devices (e.g., client device X (102-1), client device Y (102-2), client device Z (102-3), etc.) may be computing devices of any type including mobile phones, desktop or tablet personal computers (PCs) used by the users, routers, switches or servers operated by the users for accessing the network (150), or other devices operated by the users. Examples of the client devices (e.g., client device X (102-1), client device Y (102-2), client device Z (102-3), etc.) may correspond to various portions of the computing system described in reference to FIG. 4 below. In one or more embodiments, the client devices (e.g., client device X (102-1), client device Y (102-2), client device Z (102-3), etc.) may be part of a telecommunication network and are interconnected using the network (150) to transmit and receive telecommunication signals, such as Asynchronous Transfer Mode (ATM), Frame Relay, or time-division multiplexing (TDM) bit-streams.

Within the network (150), the network device X (106-1), network device Y (106-2), network device Z (106-3), network device W (106-4), etc., may be computing devices of any type, including servers, routers, switches, etc., operated by one or more service providers of the network (150). Each network device (e.g., network device X (106-1), network device Y (106-2), network device Z (106-3), network device W (106-4)) may have one or more ports, which are physical and/or logical interfaces for communicating with other network devices. Network devices may also include circuitry that is configured to performed various operations, such as the operations described below. Examples of the network devices (e.g., network device X (106-1), network device Y (106-2), network device Z (106-3), network device W (106-4)) of the network (150) may correspond to various portions of the computing system described in reference to FIG. 4 below.

Further, a network path (e.g., network path XY (151), network path XZ (152), network path YZ (153)) is an ordered sequence of one or more network links, one or more intermediate elements, and/or any intervening devices that connect two network devices through which packets flow. An intervening network device is any network device along a network path between other network devices. A network link may be a connection between two ports residing on two separate network devices (i.e., external link) or within a single network device (i.e., internal link). In one or more embodiments, a network device may be connected to multiple network paths. For example, the network device X (106-1) is connected to the network path XY (151) and the network path XZ (152). In one or more embodiments, multiple network paths may exist between two network devices. Accordingly, packets or other telecommunication data may be exchanged between the two network devices via one or more of the network paths. In one or more embodiments, the network path XY (151) is used to provide the network services to the client device X (102-1), client device Y (102-2), and client device Z (102-3) where the network device X (106-1) and network device Y (106-2) act as the interfaces (i.e., edge network devices) to the network (150). In one or more embodiments, the network (150) includes multiple layers according to a layered network architecture, such as the seven-layer OSI model of computer networking. In such embodiments, the network paths (e.g., network path XY (151)) may include network links, intermediate elements, and/or any intervening devices that support or otherwise are associated with one or more network layers. In one or more embodiments, one or more network paths (e.g., network path XY (151), network path XZ (152), network path YZ (153)) correspond to a pseudowire (PW) or a timing path associated with a PW.

A pseudowire is a particular network path that is used to emulate a point-to-point connection for a telecommunication network. The pseudowire emulates the operation of a "transparent wire" carrying telecommunication services, such as based on Asynchronous Transfer Mode (ATM), Frame Relay, time-division multiplexing (TDM), etc. For example, the client device X (102-1) and the client device Z (102-3) may be interconnected using a pseudowire that includes the network device X (106-1), network path XZ (152), network device Z (106-3), network device W (106-4), network path YZ (153), network device Y (106-2), etc. In one or more embodiments, synchronous telecommunication bit-streams are encapsulated in data packets flowing through the network path that acts as the pseudowire. A timing path is particular network path that is used to distribute timing packets for synchronizing clocks at two ends of the pseudowire. For example, the network path XY (151) may be used as the timing path to synchronize the clocks of the network device X (106-1) and network device Y (106-2) to maintain synchronized operation of the pseudowire. In one or more embodiments, the PW and the timing path associated with the PW are distinct from each other. In other words, the PW and the timing path associated with the PW are two separate network paths. In one or more embodiments, the PW and the timing path associated with the PW share at least one of the two ends of the respective network paths.

As further shown in FIG. 1.1, the network (150) includes a network management system (101) in accordance with one or more embodiments. Network management is the process of administering and managing the network (150). The network management system (101) has many functions including network service provisioning, network monitoring, fault analysis, performance management, etc. In one or more embodiments, network monitoring is performed to monitor the network (150) for detecting slow or failing elements of the network (150) and to notify the service provider(s) in case of outages or other service interruptions. In response to the notification, the network management system (101) may perform one or more network management tasks to mitigate or otherwise address the outages and service interruptions. For example, the network management tasks may include fault analysis and performance management for maintaining quality of service of the network (150).

In one or more embodiments, the network management system (101) is a dedicated device separate from the network devices (e.g., network device X (106-1), network device Y (106-2), network device Z (106-3), network device W (106-4)) that transmit information between the client devices. In one or more embodiments, at least a portion of the network management system (101) may be distributed and reside within the network devices (e.g., network device X (106-1), network device Y (106-2), network device Z (106-3), network device W (106-4)) that transmit information between the client devices.

Although FIG. 1.1 only shows three client devices (e.g., client device X (102-1), client device Y (102-2), client device Z (102-3)), four network devices (e.g., network device X (106-1), network device Y (106-2), network device Z (106-3), network device W (106-4)), and three network paths (e.g., network path XY (151), network path XZ (152), network path YZ (153)), those skilled in the art, having the benefit of this detailed description, will appreciate that the system (100) may have any number of client devices, network devices, and network paths. Further, different network paths may share one or more devices or have different devices altogether.

FIG. 1.2 shows a timing packet distribution system (120) in accordance with one or more embodiments. In one or more embodiments, the timing packet distribution system (120) includes a collection of network paths of the network (150), depicted in FIG. 1.1 above, that are used as timing paths for maintaining clock synchronization of pseudowires. The pseudowires are not explicitly shown in FIG. 1.2. One or more of the modules and elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the timing packet distribution system (120) includes a master network device (121) distributing timing packets (e.g., timing packet A (124*c*), timing packet B (124*d*)) to a slave network device A (124) via a timing path A (128*a*). In other words, the timing packets (e.g., timing packet A (124*c*), timing packet B (124*d*)) originate from the master network device (121) to traverse the timing path A (128*a*) and arrive at the slave network device A (124). In one or more embodiments, the timing packets (e.g., timing packet A (124*c*), timing packet B (124*d*)) are sent by the master network device (121) periodically, intermittently, according to a pre-determined schedule, or triggered by pre-determined events. For example, the master network device (121), timing path A (128*a*), and slave network device A (124) may correspond to the network device X (106-1), network path XY (151), and network device Y (106-2) depicted in FIG. 1.1 above. In one or more embodiments, in a multicast scenario, the master network device (121) further distributes timing packets (not shown) to additional slave network devices (e.g., slave network device B (129)) via additional timing paths (e.g., timing path B (128*b*)).

In one or more embodiments of the invention, the master network device (121) includes one or more master clocks (e.g., master clock A (121*a*), master clock B (121*b*)). A clock is an instrument that measures, keeps, and indicates time. The instrument may include hardware, software, or a combination thereof. A time reading is the time indicated by the clock. A time domain is a collection of time readings indicated by a clock as time progresses. In one or more embodiments, the master clock A (121*a*) and/or master clock B (121*b*) include the instrument that measure, keep, and indicate time. In other words, the instrument of the master clock A (121*a*) and/or master clock B (121*b*) is integrated with the master network device (121). In one or more embodiments, the master clock A (121*a*) and/or master clock B (121*b*) correspond to the time readings of the clock where the instrument of the clock may be separate from the master network device (121). In other words, the instrument of the master clock A (121*a*) and/or master clock B (121*b*) is a separate device from the master network device (121). In one or more embodiments, the time reading of the master clock A (121*a*) may be independent of and different from the time reading of the master clock B (121b). In other words, the master clock A (121a) and the master clock B (121b) correspond to two independent time domains. For example, the time reading of the master clock A (121a) and the time reading of the master clock B (121b) may have different starting time points and/or different timing units. The different master clocks may correspond to different applications, which correspond to different time domains.

In one or more embodiments, the master network device (121) is configured to insert a transmission timestamp into a timing packet and send the timing packet to at least one intervening network device in the timing path A (128a). As noted above, an intervening network device is any network device along a network path between other network devices (e.g., master network device (121), slave network device A (124)). The transmission timestamp is a time reading corresponding to when the timing packet is sent by the master network device (121). For example, the transmission timestamp A (125a) and transmission timestamp B (125b) are time readings of the master clock A (121a) and master clock B (121b), respectively, and corresponding to when the timing packet A (124c) is sent by the master network device (121). Similarly, the transmission timestamp C (125c) and transmission timestamp D (125d) are time readings of the master clock A (121a) and master clock B (121b), respectively, and corresponding to when the timing packet B (124d) is sent by the master network device (121). In particular, the transmission timestamp A (125a), transmission timestamp B (125b), transmission timestamp C (125c), and transmission timestamp D (125d) are inserted into the respective timing packets by the master network device (121).

In one or more embodiments of the invention, the timing path A (128a) includes one or more intervening network devices (e.g., intervening network device A (122), intervening network device B (123)). Each intervening network device is configured to receive a timing packet, insert a residence time, and forward the timing packet onward along the timing path A (128a). The residence time of an intervening network device is a delay time of the timing packet traversing the intervening network device. For example, the intervening network device A (122) may insert the residence time A (122a) into each received timing packet and forward the timing packet to the intervening network device B (123). Similarly, the intervening network device B (123) may insert the residence time B (123a) into each received timing packet and forward the timing packet onward to the slave network device A (124). In particular, the residence time A (122a) and residence time B (123a) correspond to delay times of the timing packet traversing the intervening network device A (122) and intervening network device B (123), respectively.

In one or more embodiments, when inserting the residence time, one or more intervening network devices may generate a cumulative residence time by combining the currently inserted residence time and one or more previously inserted residence times (i.e., by one or more upstream intervening network devices). For example, the residence time A (122a) and residence time B (123a) may be included in the cumulative residence time A (127a) when the timing packet A (124c) arrives at the slave network device A (124). In addition, the residence time A (122a) and residence time B (123a) may also be included in the cumulative residence time B (127b) when the timing packet B (124d) arrives at the slave network device A (124). In one or more embodiments, the residence time may be time dependent due to changing conditions in the network. Further, the topology of the timing path A (128a) may change from time to time due to network routing changes. In such embodiments, the cumulative residence time A (127a) and cumulative residence time B (127b) may be different from each other.

In one or more embodiments of the invention, the slave network device A (124) includes one or more clocks (e.g., slave clock A (124a), slave clock B (124b)), one or more received timing packets (e.g., timing packet A (124c), timing packet B (124d)), and one or more data packet streams (e.g., data packet stream A (128a), data packet stream B (128b)). The slave clock A (124a) and/or slave clock B (141b) may include hardware, software, or a combination thereof. The slave clock A (124a) and/or slave clock B (141b) may measure, keep, and indicate time in different manners. In other words, the time reading of the slave clock A (124a) may be independent of and different from the time reading of the slave clock B (124b). In one or more embodiments, the slave clock A (124a) and slave clock B correspond to, and are to be synchronized with, the master clock A (121a) and master clock B (121b), respectively. In one or more embodiments, the clocks (e.g., slave clock A (124a) and/or slave clock B) of the slave network device A (124) correspond to a subset of the clocks (e.g., master clock A (121a), master clock B (121b)) of the master network device (121).

In one or more embodiments, the slave network device A (124) is configured to receive a timing packet, generate a receiving timestamp of the timing packet, and synchronize a master clock and a corresponding slave clock based on the timing packet. The receiving timestamp is a time reading corresponding to when the timing packet is received by the slave network device (124). For example, the receiving timestamp A (126a) and receiving timestamp B (126b) are time readings based on the slave clock A (124a) and slave clock B (124b), respectively, and correspond to when the timing packet A (124c) is received by the slave network device (124). Similarly, the receiving timestamp C (126c) and receiving timestamp D (126d) are time readings based on the slave clock A (124a) and slave clock B (124b), respectively, and correspond to when the timing packet B (124d) is received by the slave network device (124).

In one or more embodiments, the slave network device A (124) synchronizes the master clock A (121a) and the slave clock A (124a), and synchronizes the master clock B (121b) and the slave clock B (124b), based on the received timing packets (e.g., timing packet A (124c), timing packet B (124d)) using the methods described in reference to FIGS. 2.1 and 2.2 below.

As described in reference to FIG. 1.1 above, in one or more embodiments, a pseudowire and the timing path associated with the pseudowire share at least one of the two ends of the respective network paths. As noted above, synchronous telecommunication bit-streams (e.g., bit-stream A (120a), bit-stream B (120b)) are encapsulated in data packets flowing through the network path that acts as the pseudowire. In such embodiments, the master network device (121) may be a transmitting device of the pseudowire that encapsulates the synchronous telecommunication bit streams into data packet streams, while the slave network device A (124) may be a receiving device of the pseudowire that re-generates the synchronous telecommunication bit streams from the data packet streams. The data packet stream is an ordered sequence of data packets that is transmitted by the master network device (121) and received by the slave network device A (124) via the pseudowire. For example, the data packet stream A (128a) and data packet stream B (128b) may be initially generated by the master network device (121) from the bit-stream A (120a) and bit-stream B (120b), respectively, for transmitting to the slave network device A (124). In one or more embodiments, the master network device (121) is configured to recover master clock A (121a) from the bit-stream A (120a) and/or master clock B (121b) from the bit-stream B (120b). The method of master clock recovery may include software, hardware or a combination thereof. In one or more embodiments, the slave network device A (124) is configured to process, in response to synchronizing the master clock(s) and the corresponding slave clock(s), the data packet stream (e.g., data packet stream A (128a), data packet stream B (128b)) based on the synchronized slave clock(s) to re-generate the original synchronous telecommunication bit-streams (e.g., bit-stream A (120a), bit-stream B (120b)). Accordingly, the synchronous telecommunication bit-streams (e.g., bit-stream A (120a), bit-stream B (120b)) are transported via the pseudowire in a packet transport network.

In one or more embodiments, the synchronous telecommunication bit-streams (e.g., bit-stream A (120a), bit-stream B (120b)) include time-division multiplexing (TDM) bit-streams from client devices, depicted in FIG. 1.1 above. In such embodiments, the data packet stream (e.g., data packet stream A (128a), data packet stream B (128b)) includes time-division multiplexing (TDM) pseudowire emulation (PWE) data frames. Specifically, TDM bit-streams (e.g., bit-stream A (120a), bit-stream B (120b)) are packetized into the TDM PWE data frames by the master network device (121) as transmitting device of the pseudowire. Packetization is the process of converting a TDM bit-stream into a data frame. The data frame is transmitted across the pseudowire and de-packetized at the slave network device A (124) to recover the TDM bit-stream. In particular, the TDM bit-stream is recovered based on clock synchronization between the transmitting device and receiving device of the pseudowire. For example, processing the data packet stream A (128a) by the slave network device A (124) includes de-packetizing the data packet stream A (128a) to recover the TDM bit-stream based on the slave clock A (124a). In another example, processing the data packet stream B (128b) by the slave network device A (124) includes de-packetizing the data packet stream B (128b) to recover another TDM bit-stream based on the slave clock B (124b).

In one or more embodiments, the transmitting device of the pseudowire is another slave network device (e.g., slave network device B (129)). Similar to the slave network device A (124), the slave network device B (129) includes a slave clock C (129c) and slave clock C (129d) that correspond to, and are to be synchronized with, the master clock A (121a) and master clock B (121b), respectively. Accordingly, the slave clock A (124a) and slave clock C (129c) are synchronized with each other by way of the master clock A (121a). Similarly, the slave clock B (124b) and slave clock C (129d) are synchronized with each other by way of the master clock B (121b). To recover the TDM bit-stream based on clock synchronization between the transmitting device and receiving device of the pseudowire, the data packet stream A (128a) may be generated by the slave network device B (129) based on slave clock C (129c). Accordingly, processing the data packet stream A (128a) includes de-packetizing the data packet stream A (128a) to recover the TDM bit-stream based on the slave clock A (124a). In another example, the data packet stream B (128b) may be generated by the slave network device B (129) based on the slave clock C (129d). Accordingly, processing the data packet stream B (128b) includes de-packetizing the data packet stream B (128b) to recover another TDM bit-stream based on the slave clock B (124b).

FIG. 2.1 shows a flowchart in accordance with one or more embodiments. The process shown in FIG. 2.1 may be executed, for example, by one or more components discussed above in reference to FIGS. 1.1-1.2. One or more steps shown in FIG. 2.1 may be omitted, repeated, and/or performed in a different order among different embodiments of the invention. Accordingly, embodiments of the invention should not be considered limited to the specific number and arrangement of steps shown in FIG. 2.1.

Initially, in Step 201, a timing packet for clock synchronization is received by a slave network device from a master network device via one or more intervening network devices. The timing packet includes a transmission timestamp and a residence time. In one or more embodiments, the transmission timestamp corresponds to a time when the timing packet is transmitted by the master network device and is based on a master clock of the master network device. The residence time corresponds to a delay of the timing packet traversing each intervening device. In one or more embodiments, the residence time may be accumulated over multiple intervening network devices to form a cumulative residence time.

In Step 202, a receiving timestamp is generated by the slave network device. In one or more embodiments, the receiving timestamp corresponds to a time when the timing packet is received by the slave network device and is based on a slave clock of the slave network device.

In Step 203, a time difference between the master clock and the slave clock is generated based at least on the transmission timestamp, the residence time, and the receiving timestamp. Specifically, the time difference is the difference between the time reading on the master clock and the time reading on the slave clock. In one or more embodiments, a timing packet forwarding delay is computed based on a difference between the transmission timestamp and the receiving timestamp. In particular, the timing packet forwarding delay includes the residence time of each intervening network device and the time difference. In one or more embodiments, the time difference is generated by subtracting the cumulative residence time from the timing packet forwarding delay. An example of generating the timing packet forwarding delay and the time difference is described in reference to FIG. 3.1 below.

In Step 204, the slave clock is synchronized to the master clock based at least on the time difference. In one or more embodiments, the time difference is generated for each of multiple timing packets. For example, the timing packets may be sent by the master network device periodically, intermittently, according to a pre-determined schedule, or triggered by pre-determined events. The time difference is constant for multiple timing packets when the master clock and the slave clock advance at the same rate, i.e., are synchronized. Accordingly, a synchronization error is generated based on the variation of the time differences. In one or more embodiments, the slave clock is synchronized to the master clock by adjusting the slave clock to reduce the synchronization error. An example of generating the synchronization error and adjusting the slave clock for clock synchronization is described in reference to FIG. 3.2 below.

FIG. 2.2 shows a flowchart in accordance with one or more embodiments. The process shown in FIG. 2.2 may be executed, for example, by one or more components discussed above in reference to FIGS. 1.1-1.2. One or more steps shown in FIG. 2.2 may be omitted, repeated, and/or performed in a different order among different embodiments of the invention. Accordingly, embodiments of the invention should not be considered limited to the specific number and arrangement of steps shown in FIG. 2.2.

Initially, in Step 211, a transmission timestamp is inserted by a master network device into a timing packet for sending to a slave network device. In one or more embodiments, the transmission timestamp corresponds to a time when the timing packet is transmitted by the master network device and is based on a master clock of the master network device. In one or more embodiments, the master network device includes multiple master clocks. In one or more embodiments, the timing packet is sent to the slave network device via a timing path having one or more intervening network devices.

In Step 212, a determination is made as to whether a next master clock exists in the master network device for inserting the transmission timestamp. If the determination is positive, i.e., the next master clock exists, the method returns to Step 211. If the determination is negative, i.e., no more master clock exists for inserting the transmission timestamp, the method proceeds to Step 213.

In Step 213, a residence time is inserted in the timing packet by an intervening network device within the timing path. In particular, the residence time corresponds to a delay of the timing packet traversing the intervening network device. In one or more embodiments, the residence time is accumulated over multiple intervening network devices within the timing path into a cumulative residence time.

In Step 214, a determination is made as to whether a next intervening network device exists within the timing path for inserting the residence time. If the determination is positive, i.e., the next intervening network device exists, the method returns to Step 213. If the determination is negative, i.e., no more intervening network device exists for inserting the residence time, the method proceeds to Step 215.

In Step 215, in response to receiving the timing packet, a receiving timestamp is generated by the slave network device. In one or more embodiments, the receiving timestamp corresponds to a time when the timing packet is received by the slave network device and is based on a slave clock of the slave network device.

In Step 216, a time difference between the master clock and the slave clock is generated based at least on the transmission timestamp, the residence time, and the receiving timestamp. Specifically, the time difference is the difference between the time reading on the master clock and the time reading on the slave clock. In one or more embodiments, a timing packet forwarding delay is computed based on a difference between the transmission timestamp and the receiving timestamp. In particular, the timing packet forwarding delay includes the residence time of each intervening network device and the time difference. In one or more embodiments, the time difference is generated by subtracting the cumulative residence time from the timing packet forwarding delay. An example of generating the timing packet forwarding delay and the time difference is described in reference to FIG. 3.1 below.

In Step 217, the slave clock is synchronized to the master clock based at least on the time difference. In one or more embodiments, the time difference is compared to a previous time difference that was generated from a previous timing packet. Accordingly, a synchronization error is generated based on the variation of the time differences. In one or more embodiments, the slave clock is synchronized to the master clock by adjusting the slave clock to reduce the synchronization error. For example, the instrument of the slave clock may be adjusted to run faster or slower to synchronize with the master clock. An example of generating the synchronization error and adjusting the slave clock for clock synchronization is described in reference to FIG. 3.2 below.

In Step 218, a data packet stream is processed by the slave network device based on the slave clock. In one or more embodiments, the data packet stream includes encapsulated TDM payload. In such embodiments, the data packet stream is processed to replay, or otherwise recover, a TDM bit-stream from the TDM payload based on the slave clock. An example of processing the data packet stream to replay the TDM bit-stream is described in reference to FIGS. 3.3 and 3.4 below.

In Step 219, a determination is made as to whether a next slave clock exists within the slave network device to be synchronized. If the determination is positive, i.e., the next slave clock exists to be synchronized, the method returns to Step 215. If the determination is negative, i.e., no more slave clock exists to be synchronized, the method proceeds to Step 220.

In Step 220, a determination is made as to whether a next multicast slave network device exists to receive the timing packet. If the determination is positive, i.e., the next multicast slave network device exists, the method returns to Step 215. If the determination is negative, i.e., no more multicast slave network device exists to receive the timing packet, the method proceeds to Step 221.

In Step 221, a determination is made as to whether there is a next timing packet to be sent by the master network device. In one or more embodiments, timing packets are sent by the master network device periodically, intermittently, according to a pre-determined schedule, or triggered by pre-determined events. If the determination in Step 221 is positive, i.e., the next timing packet is to be sent, the method returns to Step 211. If the determination is negative, i.e., there is no more timing packet to be sent, the method ends.

FIGS. 3.1-3.6 show an example in accordance with one or more embodiments of the invention. The example shown in FIGS. 3.1-3.6 may be, for example, based on one or more components depicted in FIGS. 1.1-1.2 above and the method flowcharts depicted in FIGS. 2.1-2.2 above. In one or more embodiments, one or more of the modules and elements shown in FIGS. 3.1-3.6 may be omitted, repeated, and/or substituted. Accordingly, embodiments of the invention should not be considered limited to the specific arrangements of modules shown in FIGS. 3.1-3.6.

FIG. 3.1 shows an example of clock synchronization between the master network device and slave network device A depicted in FIG. 1.2 above. In particular, the time on the master clock A (121a) is depicted as a line of time readings where the time reading "16" is assigned to the transmission timestamp A (125a). In other words, the time reading of the master clock A (121a) is "16" when the timing packet A (124c), depicted in FIG. 1.2 above, is transmitted by the master network device. Similarly, the time on the slave clock A (124a) is depicted as a line of time readings where the time reading "24" is assigned to the receiving timestamp A (126a). In other words, the time reading of the slave clock A (124a) is "24" when the timing packet A (124c), depicted in FIG. 1.2 above, is received by the slave network device (124). Accordingly, the timing packet forwarding delay (313) is computed as the difference between the transmission timestamp A (125a) and the receiving timestamp A (126a). Overlaying the transmission timestamp A (125a) on the time reading "16" of the slave clock A (124a) reveals that the timing packet forwarding delay (313) is a combination of the time difference (313a) and the cumulative residence time A (127a). The cumulative residence time A (127a) may also include transmission time of the timing packet through connections between network devices. The transmission time is generally significantly smaller than the residence time being accumulated for the network devices.

Specifically, the time difference (313a) is the difference between times that appear concurrent because the times readings are the same, but are not concurrent (i.e., artificially concurrent times) and the times that are actually concurrent (i.e., actual concurrent times). The actual concurrent times are times shown in FIG. 3.1 that are vertically aligned and are at the same moment in time. In other words, obtaining time readings from both the master clock and the slave clock at the exact same time would show the actual concurrent times from the master clock and the slave clock. Thus, the time difference is the difference between when the time reading of the master clock A (121a) and the slave clock A (124a) have identical time readings and the time readings that are concurrently produced by the respective clocks. For example, when the time reading of the master clock A (121a) is "10", the time reading of the slave clock A (124a) is "14". Similarly, when the time reading of the master clock A (121a) is "16", the time reading of the slave clock A (124a) is "20". In the example, the time difference is "4".

When the master clock A (121a) and the slave clock A (124a) are not synchronized, the master clock A (121a) and the slave clock A (124a) advance at different rate resulting in variation of the time reading differences between the master clock A (121a) and the slave clock A (124a). FIG. 3.2 shows three examples of the variation in time reading differences. In each of the examples, the vertical axis corresponds to the time difference while the horizontal axis corresponds to time. In addition, the time difference is computed by subtracting the time reading of the master clock A (121a) from the time reading of the slave clock A (124a).

As shown in FIG. 3.2, the variation A (320a) shows increasing time difference as time progresses. In other words, the time difference computed from a later timing packet is larger than the time difference computed from an earlier timing packet. In the example of variation A (320a), the increasing time difference indicates that the slave clock A (124a) is running faster than the master clock A (121a). In response, the slave clock A (124a) is adjusted to run slower in an attempt to synchronize with the master clock A (121a).

Subsequent to the adjustment based on the variation A (320a), the variation B (320b) shows decreasing time difference as time progresses. In other words, the time difference computed from a later timing packet is smaller than the time difference computed from an earlier timing packet. In the example of variation B (320b), the decreasing time difference indicates that the slave clock A (124a) is running slower than the master clock A (121a). In response, the slave clock A (124a) is further adjusted to run faster in an attempt to synchronize with the master clock A (121a).

Subsequent to the further adjustment based on the variation B (320b), the variation C (320c) shows constant time difference as time progresses. In other words, the time difference computed from a later timing packet is substantially the same as the time difference computed from an earlier timing packet. In the example of variation C (320c), the constant time difference indicates that the slave clock A (124a) and the master clock A (121a) advance at substantially the same rate. In other words, the slave clock A (124a) is synchronized with the master clock A (121a).

FIG. 3.3 shows an example of incorporating timing information of multiple time domains in a single timing packet traversing from the master network device (121) to the slave network device A (124), as depicted in FIG. 1.2 above. As shown in FIG. 3.3, the master network device (121) includes multiple master clocks (321) denoted as $T_1, T_2, T_3, \ldots, T_n$, e.g., recovered from multiple synchronous bit streams denoted as B1, B2, B3, . . . , Bn. Correspondingly, the slave network device A (124) includes multiple slave clocks (324) denoted as $T_{1'}, T_{2'}, T_{3'}, \ldots, T_{n'}$. For example, $T_1$ and $T_2$ may correspond to the master clock A (121a) and master clock B (121b), respectively, depicted in FIG. 1.2 above. Similarly, $T_{1'}$ and $T_{2'}$ may correspond to the slave clock A (124a) and slave clock B (124b), respectively, depicted in FIG. 1.2 above.

Further as shown in FIG. 3.3, the timing packet A (124c) is initially inserted with transmission timestamps (125). In particular, the transmission timestamps (125) includes the time readings 100.345, 101.123, 100.067, . . . , 105.245 corresponding to $T_1, T_2, T_3, \ldots, T_n$. When the timing packet A (124c) reaches the intervening network device A (122), the residence time A (122a) of the intervening network device A (122) is accumulated into the cumulative residence time A (127a) resulting in the value "10 μs" of the cumulative residence time A (127a). When the timing packet A (124c) further reaches the intervening network device B (123), the residence time B (123a) of the intervening network device B (123) is further accumulated into the cumulative residence time B (127b) resulting in the value "35 μs" of the cumulative residence time B (127b). When the timing packet A (124c) finally reaches the slave network device A (124), the cumulative residence time B (127b) is combined with the transmission timestamps (125) resulting in the values 100.380, 101.158, 100.102, . . . , 105.280 of the delayed transmission timestamps (130). Accordingly, the delayed transmission timestamps (130) may be subtracted from the receiving timestamps (not shown) generated based on $T_{1'}, T_{2'}, T_{3'}, \ldots, T_{n'}$, to compute time differences and synchronization errors in the multiple time domains.

FIGS. 3.4 and 3.5 show an example of time-division multiplexing (TDM) pseudowire emulation (PWE) based on the clock synchronization example described in reference to FIGS. 3.1-3.3 above. In one or more embodiments, a pseudowire (PW) is an emulation of a point-to-point connection over a packet transport network, such as the network (150) described in reference to FIG. 1.1 above. The pseudowire emulates the operation of a "transparent wire" carrying data communication services, such as based on Asynchronous Transfer Mode (ATM), Frame Relay, time-division multiplexing (TDM), etc. The underlying packet transport network may be based on multi-protocol label switching (MPLS), Internet protocol (IPv4 or IPv6), or layer 2 tunneling protocol version 3 (L2TPv3). FIG. 3.4 shows examples of data packets transmitted over the data transport network to carry TDM services. For example, the data packet A (340a) carries a TDM payload encapsulated in an Ethernet packet based on Metro Ethernet Forum (MEF) 8 specification. In another example, the data packet B (340b) carries a TDM payload encapsulated in an Ethernet packet based on an Internet Engineering Task Force (IETF) Dry-Martini specification. In yet another example, the data packet C (340c) carries a TDM payload encapsulated in an Ethernet packet based on an IETF MPLS specification.

FIG. 3.5 shows example TDM PWE services, depicted according to the legend (344), used by a mobile operator 1 (MO-1) network (341) and mobile operator 2 (MO-2) network (342) based on a wholesale transport (WT) network (343). The WT network (343) is an example of the network (150) described in reference to FIG. 1.1 above. As shown in FIG. 3.5, the WT network (343) is a packet transport network to interconnect sites for other network operators and service providers. The WT network (343) may be, but not limited to, a carrier network (e.g., SONET/SDH network) operated by a carrier. The carrier may be a wholesale service provider for out-of-region connectivity, or a business unit providing connectivity for other business units within the same operator. Customers of the WT network (343) access the WT network (343) via physical connectivity to network elements (NEs) at the edge (i.e., endpoints) of the WT network (343). The network elements denoted as NE1 and NE2 may correspond to the slave network device (124) and the master network device (121), respectively, depicted in FIGS. 1.2, 3.1, and 3.3 above. The WT network (343) may serve many different customers and applications (e.g., corresponding to the client devices depicted in FIG. 1.1 above) with individual timing requirements and time domains. A time domain is a set of one or more network elements and devices that share the same traceable primary reference clock. The time domain of the WT network (343) is referred to as the time domain WT. The WT network (343) provides a time domain WT reference clock, which is used as the master clock to synchronize the slave clock of each of the network elements and devices in the time domain WT.

The MO-1 network (341) includes distributed radio access networks (RANs) that are sparsely interconnected among themselves, and connected to associated mobility switching centre(s) (MSCs). The RANs and MSCs are not explicitly shown in FIG. 3.4 for clarity. In one or more embodiments, the interconnections of the RANs and MSC(s) are established by leasing TDM PWE services from the WT network (343). For example, the RANs and MSC(s) connect to the TDM PWE services via endpoints (e.g., NE1, NE2) of the WT network (343). In one or more embodiments, the leased TDM PWE services are used to form telecommunication circuits (including channelized circuits) such as, but not limited to, DS0, E1, OC-3, OC-768, STM-1, STM-256, STM-640, etc. The time domain of the MO-1 network (343) is referred to as the MO-1 time domain. The MO-1 network (341) provides a time domain MO-1 reference clock, which is used as the master clock to synchronize the slave clock of each of the network elements and devices in the time domain WO-1.

The MO-2 network (342) is similar to the MO-1 network (341) but is independently operated, or otherwise separately controlled from the MO-1 network (341). The time domain of the MO-2 network (342) is referred to as the MO-2 time domain. The MO-2 network (342) provides a time domain MO-2 reference clock, which is used as the master clock to synchronize the slave clock of each of the network elements and devices in the time domain WO-2.

In an example scenario, the MO-1 network (341) and MO-2 network (342) are operated by carrier SONET/SDH network operators as significant revenue sources. Because the SONET/SDH network is a relatively costly and capacity limited transport technology, a carrier SONET/SDH network operator may reduce operational expenses using more cost efficient packet transport networks, such as the WT network (343). A SONET/SDH transport network inherently operates on a network-side synchronous transport and derives the frequency clock of the TDM services from the transport clock. In contrast, a packet transport network does not have an inherent reference clock. Accordingly, the WT network (343) uses the example clock synchronization method depicted in FIGS. 3.1-3.3 above to synchronize both ends of the TDM PW such that data bits transmitted by NE2 may be played back by NE1 at the same frequency as NE2.

Time domains MO-1, MO-2, and WT may use completely disparate technologies for the respective primary reference clocks (PRCs). For example, the PRC may be a global navigation satellite system (GNSS) (e.g., GPS, Galileo, GLONASS), an atomic clock, or any other stratum 1 clock reference. Because a clock exhibits a unique performance characteristics (e.g., drift, wander, stability) that may further vary based on temperature and environmental conditions, no two time domains are identical.

In one or more embodiments, the TDM PWE services (i.e., pseudowires) provided by the WT network (341) are Edge-to-Edge PWE (PWE3) services, represented in FIG. 3.5 as linear pipes according to the legend (344). The linear pipes denoted as MO-2, MO-1, and L2/L3 are in the packet transport domain. Specifically, TDM bit-streams from TDM circuits in the MO-1 network (341) and MO-2 network (342) are packetized by the PWE transmitter (i.e., NE2). Packetization is the process of converting a TDM bit-stream into a data frame. The data frame is transmitted across the PWE3 linear pipes and de-packetized at the PWE receiver (i.e., NE1) to recover the TDM bit-stream.

Within the WT network (341), each TDM circuit at NE2 destined to NE1 sends transmission timestamps within the multi-domain timing packet stream (345) for distribution to NE1. As shown in FIG. 3.5, the multi-domain timing packet stream (345) is separated from the PWE3 linear pipes that transport the data packet stream associated directly with the TDM PW. Such separation allows the operators of MO-1 network (341) and MO-2 network (342) to deliver synchronization to multiple frequency clocks between any pair of TDM PW terminating devices. Further, distributing the multi-domain timing packet stream (345) may be performed as a software function eliminating the need for specialized network hardware at every hop or external clock master equipment. In other words, software services in the WT network (341) are TDM synchronization aware by recognizing the multi-domain timing packet stream (345) as a clock signal.

As a software function, intervening network elements traversed by the multi-domain timing packet stream (345) facilitate removing jitter in the clock recovery by accumulating residence time into the TDM timing packet. During the distribution to NE1 from NE2, the multi-domain timing packet stream (345) may traverse one or more network elements within the WT network (341). For example, the one or more network elements traversed by the multi-domain timing packet stream (345) may correspond to the network device A (326a) and network device B (326b) depicted in FIG. 3.3 above, and/or the timing path A (128a) depicted in FIG. 1.2 above. Each network element traversed may impair the timing characteristics represented by the multi-domain timing packet stream. The impairments may include packet loss, packet delays, and variability in the packet delays. The variability in the packet delays in the multi-domain timing packet stream is referred to as packet delay variation (PDV) or inter-frame delay variation (IFDV). As described above in reference to FIGS. 3.1 and 3.2, the IFDV is tracked for the PWE receiver (i.e., NE1) to recover a more accurate slave clock. Further as described above in reference to FIG. 3.3, a single stream of multi-domain timing packets is used to track multiple IFDVs of multiple time domains such that the PWE receiver (i.e., NE1) may recover a more accurate slave clock for the each of the multiple time domains.

The recovery of the true frequency of each TDM circuit is based on the ability of the PWE receiver (i.e., NE1) to estimate the frequency from: (1) the arrival times of multi-domain timing packets, (2) each circuit's transmission timestamps in the multi-domain timing packets, and (3) factoring in the frequency compensation or correction that was accumulated at each network element along the timing path. The recovered frequency clock by NE1 enables to replaying or recovering the TDM PWE bit-stream at the same frequency as received by NE2 from the MO-1 network (341) and MO-2 network (342). When the PWE transmitter (i.e., NE2) and PWE receiver (i.e., NE1) are not synchronized in frequency, anomalous and undesirable bit slips occur. Bit slips may be a result of two possible conditions, under-runs or over-runs. The under-run is the unavailability of a bit to be transmitted when the bit needs to be transmitted. In other words, the under-run corresponds to the arrival of the PWE packet stream being at a lower rate than the actual frequency of the PWE receiver, resulting in observable anomalies such as voice clipping or video scrambling. The overrun is the availability of a bit that does not have an available timeslot in which to be transmitted on the TDM circuit, leading to delays in transmitting the bit-stream.

FIG. 3.6 shows a variation of the example TDM PWE services depicted in FIG. 3.5 above. In particular, FIG. 3.6 shows a multicast scenario according to the legend (361), where a multi-domain timing packet stream originates from a single PWE transmitter (i.e., NE2) and terminates on multiple PWE receivers (i.e., NE1, NE3). As used herein, a clear channel circuit is a communications circuit having a single channel on which only one transmitter operates at a time. In contrast, a channelized circuit is a communications circuit having multiple channels. Specifically, the single PWE transmitter (i.e., NE2) receives (i) TDM bit-streams from channelized circuits of the MO-1 network, such as OC-3c, STM-1c, etc., (ii) TDM bit-streams from clear channel circuits of the MO-2 network, such as OC-48, STM-768, etc., and (iii) TDM bit-streams from digital signal TDM circuits of the MO-3 network, such as DS0, E1, etc. Correspondingly, the PWE receiver NE1 recovers the TDM bit-streams for returning to (i) digital signal TDM circuits of the MO-1 network, and (ii) clear channel circuits of the MO-2 network. Similarly, the PWE receiver NE3 recovers the TDM bit-streams for returning to digital signal TDM circuits of the MO-3 network.

As shown in FIG. 3.6, each PWE receiver (i.e., NE1, NE3) selects information in the multi-domain timing packet stream that is related to the PWE receiver's time domain(s) for processing and ignores unrelated information. For example, NE1 selects information related to time domains MO-1 and MO-2 for processing and discards information related to time domain MO-3. In another example, NE3 selects information related to time domain MO-3 for processing and discards information related to time domains MO-1 and MO-2.

Although not explicitly shown, NE1 and NE3 may also act as the PWE transmitter/receiver pair. For example, TDM bit-streams from TDM circuits in the MO-1 network (341) and MO-2 network (342) may be packetized by NE3 (i.e., PWE transmitter) into data frames that are transmitted across a pseudowire and de-packetized at NE1 (i.e., PWE receiver) to recover the TDM bit-stream. Although the clock used by NE3 to packetize the TDM bit-streams is not directly synchronized to the clock used by NE1 to depacketize the data frames, the clocks used by the NE3 and NE1 are both synchronized to the master clock of NE2 and therefore allow accurate recovering of the TDM bit-stream.

One or more embodiments of the invention may separate the TDM timing packet stream from the data packet stream associated directly with the TDM PWE, thus allowing the TDM network operator to deliver synchronization to multiple frequency clocks between any pair of TDM PW terminating devices.

One or more embodiments of the invention may enable Tier 2 & 3 packet network operators to overlay TDM services without specialized timing hardware in the network. Specifically, the network operations on the timing packets may be performed in software.

One or more embodiments of the invention may enable interconnect of TDM services from multiple enterprises across a common network without imposing traceability to a single common primary reference clock.

One or more embodiments of the invention may mitigate the reliance on in-house expertise and a management system dedicated to synchronization, management, and troubleshooting related to complex timing trails traceable to a single PRC.

One or more embodiments of the invention may constrain relevant timing diagnosis to the path between two TDM PW endpoints hosting packet nodes in the network.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for clock synchronization in a network, comprising:
   receiving, by a first slave network device from a master network device via at least a first intervening network device, a first timing packet comprising a first transmission timestamp and a first residence time, wherein the first transmission timestamp is based on a first master clock of the master network device, wherein the first residence time corresponds to a delay of the first timing packet traversing the first intervening device;
   generating, by the first slave network device in response to receiving the first timing packet, a first receiving timestamp based on a first slave clock of the first slave network device;
   generating, based at least on the first transmission timestamp, the first residence time, and the first receiving timestamp, a first time difference between the first master clock and the first slave clock; and
   synchronizing, based at least on the first time difference, the first master clock and the first slave clock,
   wherein the first timing packet is received by the first slave network device from the master network device via a first timing path comprising the first intervening network device and a second intervening network device,
   wherein the first timing packet further comprises a second residence time of the first timing packet traversing the second intervening network device, and
   wherein generating the first time difference is further based on the second residence time.

2. The method of claim 1, further comprising:
   processing, by the first slave network device in response to synchronizing the first master clock and the first slave clock, a data packet stream based on the first slave clock.

3. The method of claim 2, wherein processing the data packet stream comprises:
   recovering, by the first slave network device based on the first slave clock, a time-division multiplexing signal from the data packet stream.

4. The method of claim 1, wherein generating the first time difference comprises:

computing, based on the first transmission timestamp and the first receiving timestamp, a timing packet forwarding delay; and
subtracting at least the first residence time from the timing packet forwarding delay to generate the first time difference.

5. The method of claim 1, further comprising:
   receiving, by the first slave network device from the master network device, a second timing packet subsequent to the first timing packet;
   generating, based on the second timing packet, a second time difference between the first master clock and the first slave clock;
   generating a first synchronization error by at least comparing the first time difference and the second time difference; and
   adjusting, based on the first synchronization error, the first slave clock to synchronize the first master clock and the first slave clock.

6. The method of claim 5,
   wherein the first time difference and the second time difference are time-dependent, and
   wherein the first synchronization error comprises a variation between the first time difference and the second time difference with respect to time.

7. The method of claim 5, further comprising:
   receiving, by the first slave network device from the master network device, a third timing packet subsequent to the second timing packet; and
   generating a second synchronization error based at least on the second timing packet and the third timing packet,
   wherein the first slave clock is adjusted based on the first synchronization error so as to reduce the second synchronization error.

8. The method of claim 1, wherein the first timing packet further comprises a second transmission timestamp based on a second master clock of the master network device, the method further comprising:
   generating, by the first slave network device in response to receiving the first timing packet, a second receiving timestamp based on a second slave clock of the first slave network device;
   generating, based at least on the second transmission timestamp, the first residence time, and the second receiving timestamp, a second time difference between the second master clock and the second slave clock; and
   synchronizing, based at least on the second time difference, the second master clock and the second slave clock,
   wherein the first master clock and the first slave clock form a first timing domain of the master network device and the first slave network device, and
   wherein the second master clock and the second slave clock form a second timing domain of the master network device and the first slave network device.

9. A slave network device, comprising:
   a first slave clock; and
   circuitry configured to:
      receive, from a master network device via a first intervening network device, a first timing packet comprising a first transmission timestamp and a first residence time, wherein the first transmission timestamp is based on a first master clock of the master network device, wherein the first residence time corresponds to a delay of the first timing packet traversing the first intervening device;

generate, in response to receiving the first timing packet, a first receiving timestamp based on the first slave clock;

generate, based at least on the first transmission timestamp, the first residence time, and the first receiving timestamp, a first time difference between the first master clock and the first slave clock; and synchronize, based at least on the first time difference, the first master clock and the first slave clock, wherein the first timing packet is received by the slave network device from the master network device via a first timing path comprising the first intervening network device and a second intervening network device, wherein the first timing packet further comprises a second residence time of the first timing packet traversing the second intervening network device, and wherein generating the first time difference is further based on the second residence time.

10. The slave network device of claim 9, wherein the timing packet comprises a multicast timing packet.

11. The slave network device of claim 9, the circuitry further configured to:

process, in response to synchronizing the first master clock and the first slave clock, a data packet stream based on the first slave clock.

12. The slave network device of claim 11, wherein processing the data packet stream comprises:

recovering, based on the first slave clock, a time-division multiplexing signal from the data packet stream.

13. The slave network device of claim 9, wherein generating the first time difference comprises:

computing, based on the first transmission timestamp and the first receiving timestamp, a timing packet forwarding delay; and subtracting the first residence time from the timing packet forwarding delay to generate the first time difference.

14. The slave network device of claim 9, the circuitry further configured to:

receive, from the master network device, a second timing packet subsequent to the first timing packet;

generate, based on the second timing packet, a second time difference between the master clock and the first slave clock;

generate a first synchronization error by at least comparing the first time difference and the second time difference; and adjust, based on the first synchronization error, the first slave clock to synchronize the first master clock and the first slave clock.

15. The slave network device of claim 14, wherein the first time difference and the second time difference are time-dependent, and wherein the first synchronization error comprises a variation between the first time difference and the second time difference with respect to time.

16. The slave network device of claim 14, the circuitry further configured to:

receive, from the master network device, a third timing packet subsequent to the second timing packet; and generate a second synchronization error based at least on the second timing packet and the third timing packet, wherein the first slave clock is adjusted based on the first synchronization error so as to reduce the second synchronization error.

17. The slave network device of claim 9, wherein the first timing packet further comprises a second transmission timestamp based on a second master clock of the master network device, wherein the circuitry is further configured to:

generate, in response to receiving the first timing packet, a second receiving timestamp based on a second slave clock of the slave network device;

generate, based at least on the second transmission timestamp, the first residence time, and the second receiving timestamp, a second time difference between the second master clock and the second slave clock; and synchronize, based at least on the second time difference, the second master clock and the second slave clock, wherein the first master clock and the first slave clock form a first timing domain of the master network device and the slave network device, and wherein the second master clock and the second slave clock form a second timing domain of the master network device and the slave network device.

18. A slave network device, comprising:

a first slave clock; and circuitry configured to:

receive, from a master network device via a first intervening network device, a first timing packet comprising a first transmission timestamp and a first residence time, wherein the first transmission timestamp is based on a first master clock of the master network device, wherein the first residence time corresponds to a delay of the first timing packet traversing the first intervening device;

generate, in response to receiving the first timing packet, a first receiving timestamp based on the first slave clock;

generate, based at least on the first transmission timestamp, the first residence time, and the first receiving timestamp, a first time difference between the first master clock and the first slave clock; and synchronize, based at least on the first time difference, the first master clock and the first slave clock, wherein the first time difference is generated by computing, based on the first transmission timestamp and the first receiving timestamp, a timing packet forwarding delay; and subtracting the first residence time from the timing packet forwarding delay to generate the first time difference.

19. The slave network device of claim 18, wherein the timing packet comprises a multicast timing packet.

20. The slave network device of claim 18, the circuitry further configured to:

process, in response to synchronizing the first master clock and the first slave clock, a data packet stream based on the first slave clock.

* * * * *